G. ENGLER.
FEED BAG.
APPLICATION FILED MAY 23, 1919.

1,368,911.

Patented Feb. 15, 1921.

Witnesses

Inventor
Gustav Engler
By Victor J. Evans
Attorney

UNITED STATES PATENT OFFICE.

GUSTAV ENGLER, OF NEW YORK, N. Y.

FEED-BAG.

1,368,911.     Specification of Letters Patent.     Patented Feb. 15, 1921.

Application filed May 23, 1919. Serial No. 299,101.

*To all whom it may concern:*

Be it known that I, GUSTAV ENGLER, a subject of the Hungarian Government, residing at New York, in the county of New York and State of New York, have invented new and useful Improvements in Feed-Bags, of which the following is a specification.

This invention relates to new and useful improvements in feed bags, and pertains more particularly to devices of this character which are adapted to be attached to an animal when in use.

The primary object of the invention is to provide a device of this character in which the contents are prevented from scattering in the event of the animal throwing its head in an effort to get all of the feed in the bag.

A further object of the invention is to construct a device of this character in the cheapest possible manner.

With the above, and other objects in view which will appear as the nature of the invention is better understood, reference is had to the accompanying drawings in which:—

Figure 1:
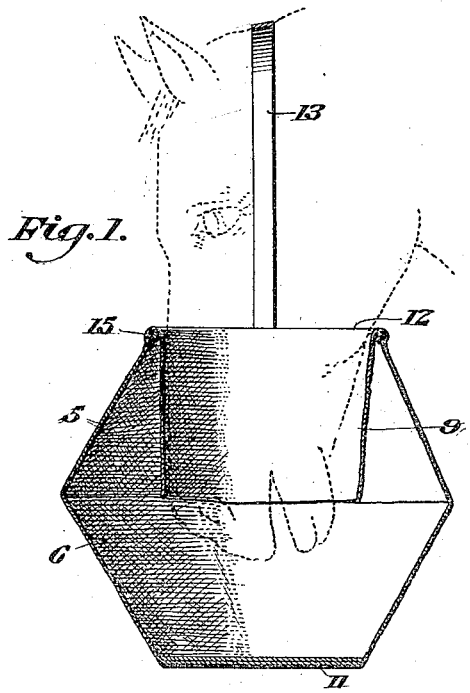
Figure 1 is a vertical sectional view of the device showing the manner in which it is used.
Figure 2:
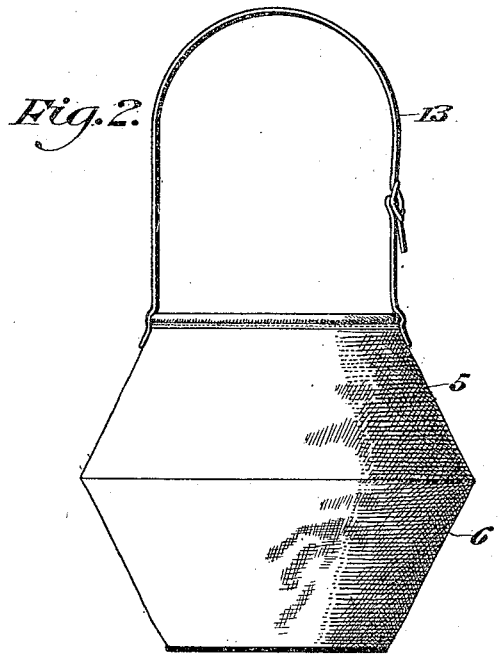
Fig. 2 is a view in elevation.
Figure 3:
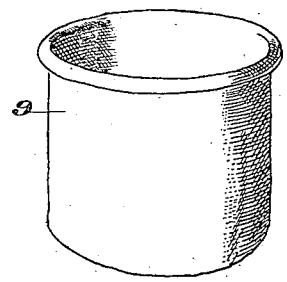
Fig. 3 is a detail view of the guard.

Referring more particularly to the drawings, the device comprises two hollow frusto-conical members 5 and 6, which are secured together in such a manner as to form a receptacle, the greatest diameter of which is at the center thereof. The frusto-conical members 5 and 6 are preferably formed of heavy canvas or like material, but I do not wish to limit myself to the use thereof as metal or other material may be employed without departing from the spirit of the invention.

The bottom of the receptacle 6 is closed by a suitable bottom wall 11, and the top of the member 5 is provided with an opening 12 to permit of the insertion of the head of the animal when the device is in use.

A head strap 13 is also provided by which the bag is attached to the head of the animal.

Projecting into the bag from the opening 12 thereof, there is a guard 9 which is preferably made of canvas and is secured to the bag by having its upper end turned over a rigid ring 15, which is secured in the open end 12 of the member 5. This guard 9 is preferably cylindrical in shape, and is adapted to snugly fit the head of the animal, and the lower end of said guard is open and terminates at a point level with the juncture of the two frusto-conical members 5 and 6, or in other words at the point of greatest diameter of the feed bag.

By such an arrangement as above described, it will be seen that when the animal throws its head in an effort to get the food from the bag, the same will be thrown upwardly into the space around the tubular guard 9 instead of being thrown from the bag as is the case in feed bags of the ordinary type, the throwing of the feed from the bag being prevented by snug fit of the guard 9 with the head of the animal.

Having thus described the invention, what is claimed is:

1. A feed bag comprising two hollow frusto-conical members secured together at their large ends to form a receptacle, one of said members being provided with an open end, and a guard projecting into the receptacle from said open end and terminating at a point in the same plane as the juncture between the two frusto-conical members whereby said guard always terminates substantially in the line of maximum girth of said bag in all positions of the bottom thereof when said bag is suspended from its open end.

2. A feed bag comprising two hollow frusto-conical members secured together to form a receptacle the greatest diameter of which is always centrally of its ends, and a tubular guard projecting into said receptacle and having its free end terminating in a plane with the greatest diameter of the receptacle.

3. A feed bag comprising two hollow frusto-conical members secured together to form a receptacle, the greatest diameter of which is central of its ends, an opening provided in one of the walls of one of the frusto-conical members, a rigid member defining said opening, and a tubular guard member secured to said rigid member and projecting inwardly of said receptacle, the free end of said tubular guard terminating at a point in the same plane as the greatest diameter of the receptacle.

4. A feed bag comprising two frusto conical sections, the large ends of which are joined together so that the two sections constitute an open ended receptacle, and a flexible guard of cylindrical formation extending in a downward direction from the open end of the bag and terminating at the juncture of the receptacle sections so as to dispose the base of the guard at the point of maximum diameter of the bag and permit the guard to be freely flexed with relation to the walls of the upper section of the bag.

In testimony whereof I have affixed my signature.

GUSTAV ENGLER.